(12) United States Patent
Friedrich et al.

(10) Patent No.: US 6,234,285 B1
(45) Date of Patent: *May 22, 2001

(54) RETARDER

(75) Inventors: Jurgen Friedrich; Klaus Vogelsang; Werner Adams, all of Crailsheim (DE)

(73) Assignee: Voith Turbo GmbH & Co KG, Heidenheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,477

(22) Filed: Jun. 12, 1997

(30) Foreign Application Priority Data

Jun. 14, 1996 (DE) .............................. 196 23 680

(51) Int. Cl.[7] ................................... F16D 57/02
(52) U.S. Cl. .......................... 188/296; 188/290

(58) Field of Search .................................... 188/290, 291, 188/292, 296

(56) References Cited

U.S. PATENT DOCUMENTS 3,367,461   2/1968   Nagel .

FOREIGN PATENT DOCUMENTS

| 1946167     | 5/1970  | (DE) . |
| 2 203 319   | 8/1973  | (DE) . |
| 38 37 142 A1 | 5/1989 | (DE) . |
| 44 40 165 A1 | 7/1995 | (DE) . |
| 7317412     | 12/1974 | (FR) . |

*Primary Examiner*—Matthew C. Graham
(74) *Attorney, Agent, or Firm*—Randall J. Knuth

(57) ABSTRACT

A retarder with retarder housing for receiving a retarder unit comprising a stator and a rotor fitted on the retarder shaft. The retarder is intended for assembly in a transmission housing. The retarder housing features a cup-shaped recess matching in its design the outer contours of rotor and stator, (a preassembled retarder unit) thus being able to receive the retarder unit in an assembled state.

13 Claims, 2 Drawing Sheets

RETARDER

BACKGROUND OF THE INVENTION

1. Field of the Invention

The invention relates to a retarder which is part of a drive assembly, notably for vehicles and specifically in conjunction with an internal combustion engine and a transmission.

2. Description of the Related Art

A drive unit with a retarder and a transmission is known from German Patent Document DE 44 40 165 A1.

Owing to their particular properties, hydrodynamic retarders are recently being increasingly employed. Their operation involves neither wear nor fatigue, enabling them to reliably retard vehicles with large masses on longer grade stretches.

Vehicle manufacturers insist on a maximally compact design of the individual units of drive assemblies. Besides, easier and faster assembly and disassembly of the individual units is desirable, both for purposes of first assembly and also service work. This is true particularly for the retarder.

German Patent Document DE 38 37 142 A1 shows and describes a retarder which, as a self-contained assembly, can be installed from outside in a housing of a change-speed gearbox. While this occasions a certain simplification over other retarders, this prior retarder, however, is not optimal with respect to its manufacture and the space needed.

SUMMARY OF THE INVENTION

The retarder assembly of the present invention includes a retarder housing, a stator disposed within said retarder housing, and a retarder shaft fitted with a rotor enclosed by a rotor housing. The retarder housing accommodates the rotor and stator and is intended for assembly into a transmission housing. The retarder housing has a cup-shaped recess that matches the outside contours of the rotor, said rotor housing and said stator, thereby enabling the retarder housing to receive the rotor housing with the rotor and stator in assembled state to form a retarder unit.

The objective underlying the invention is designing a retarder to the effect that it consists of few components and that it allows quick and process-matched assembly and disassembly.

The inventional design of the retarder makes it possible to prefabricate its hydrodynamic components and their mounting and to insert it in completely assembled state, as a cartridge, in the retarder housing. Thus, it is no longer necessary to fix the rotor or the stator by screwing; instead, mounting can be accomplished by clamping or bolting. A screw joint on the back of the retarder is dispensable. The option of manufacturing the hydrodynamic components of the retarder as a complete unit in a preassembly operation allows drastic reductions in manufacturing costs.

BRIEF DESCRIPTION OF THE DRAWING

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
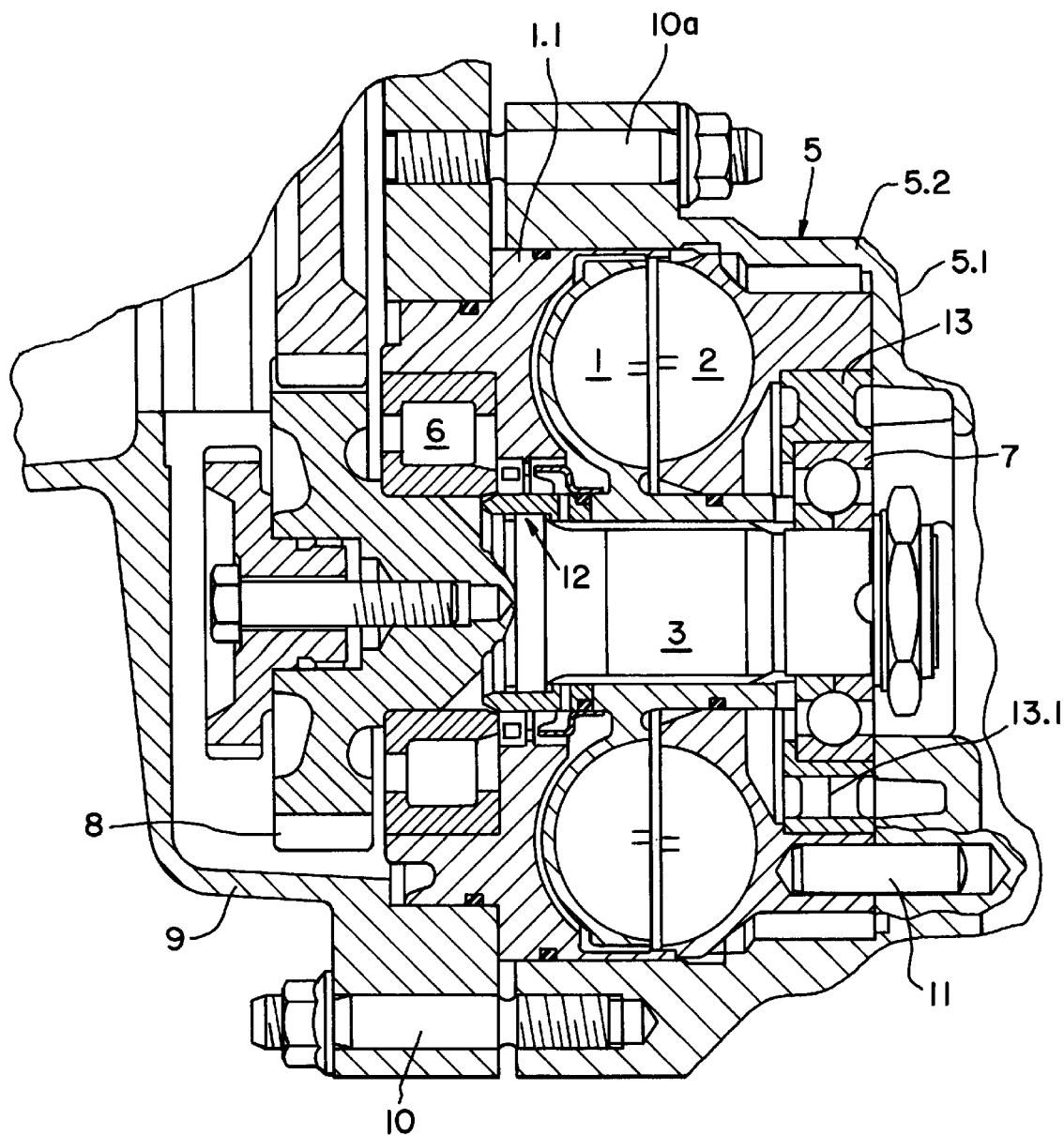
FIG. 1 is a sectional view of the retarder assembly of its present invention.

FIG. 1 shows schematically a retarder with a rotor impeller 1 and a stator impeller 2 which together form a toroidal working space. The rotor is keyed on the retarder shaft 3 and enclosed by a rotor housing 1.1. Visible, moreover, is the retarder housing 5 accommodating the rotor 1 and stator 2. As can be seen, it is cup-shaped, with a cupped bottom 5.1 and a cylindrical peripheral wall 5.2.

The retarder shaft 3 is mounted on the rotor housing 1.1 and by way of radial bearings 6 and 7, respectively on the stator 2. The bearing 7 is at the same time an axial bearing.

The rotor shaft 3 supports a gear 8 that features skew teeth and introduces a torque from the transmission in the retarder.

Visible, moreover, is part of the transmission housing 9, such as, a transmission end housing.

Concentric to the retarder shaft 3, several screws 10 traverse appropriate bores in the transmission end housing 9 and screw into tapped bores in the retarder housing 5. For reasons of space, a screw 10a screws from the retarder side into the transmission end housing 9. An axial pin 11 may be used to join retarder housing 5 with stator 2.

The assembly procedure is as follows:

Rotor 1 with rotor housing 1.1, stator 2, retarder shaft 3, with the two bearings 6, 7, and the keyed gear 8 are assembled to one another to form a retarder unit. Next, this unit is inserted in the cupped recess 5.1, 5.2, of the retarder housing 5. Axial pin 11 may be used to join retarder housing 5 with stator 2. Thereafter, the retarder housing 5 with the unit contained in it is assembled to the transmission end housing 9 along a plane and fastened by means of screws 10, 10a. The retarder is thus immediately installed and ready for use.

The bearing 6 is lubricated with the transmission oil, while the bearing 7 is lubricated by the retarder working oil. Both oils are different, for which reason packings 12 are disposed in the area of the bearing 6.

Bearing 7 is enclosed by a ring 13 serving, for one, as a bearing support ring and featuring openings 13.1 for charging the retarder with operating oil.

Figure 2:
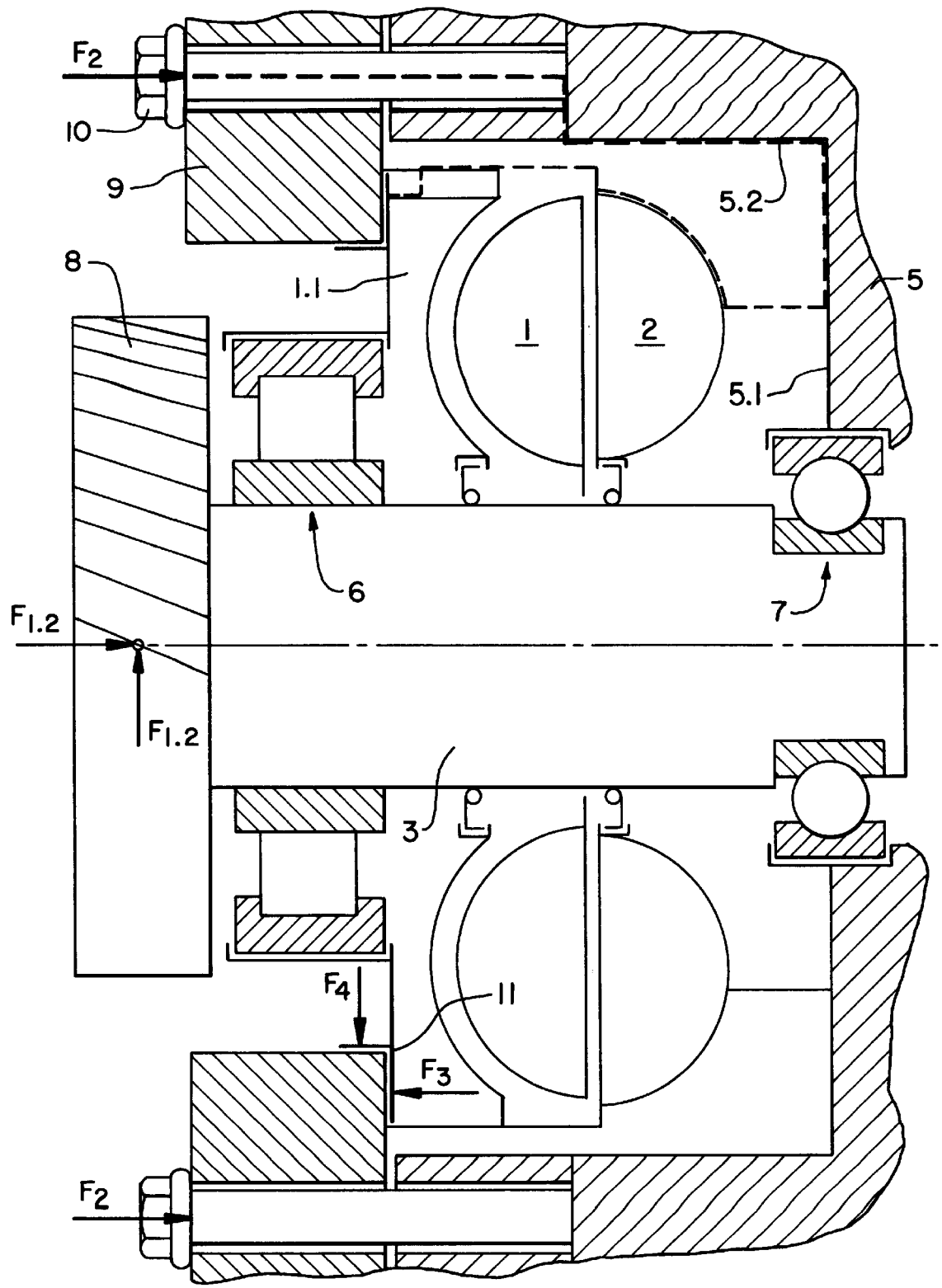
FIG. 2 is a force diagram of the retarder assembly after insertion and clamping.

FIG. 2 is a still more schematized illustration of a retarder. It depicts a force diagram occasioned after insertion and clamping the hydrodynamic components of the retarder in the cup-shaped recess 5.1, 5.2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A retarder assembly comprising:

a transmission housing;

a retarder housing;

a stator;

a retarder shaft with bearings, said retarder shaft fitted with a rotor enclosed by a rotor housing;

said stator and said rotor forming a retarder unit;

said retarder housing accommodating said retarder unit and assembled to a transmission housing said retarder housing, said retarder shaft, and said retarder unit forming a preassembled unit adapted to be installed to the transmission housing; and said retarder housing having a cup-shaped recess that matches the outside contours of said retarder unit thereby enabling said retarder housing to receive said retarder unit.

2. The retarder assembly of claim 1, in which said retarder further includes:

mounting screws traversing of the transmission housing and adapted for screwing into said retarder housing, said screws grasping said retarder housing in the inserted state of the said unit, in order to fasten the latter in said cup-shaped recess.

3. The retarder assembly of claim 1, in which stationary components of said rotor housing and said stator are retained in said cup-shaped recess exclusively by clamping.

4. The retarder assembly of claim 1, in which said retarder shaft is mounted on the rotor housing and on the stator.

5. The retarder assembly of claim 1, in which said retarder housing and said stator are joined together by at least one axial pin.

6. The retarder assembly of claim 1, in which said cup-shaped recess is dimensioned and designed such that it can receive hydrodynamic parts of different size.

7. The retarder assembly of claim 2, in which stationary components of said rotor housing and said stator are retained in said cup-shaped recess exclusively by clamping.

8. The retarder assembly of claim 2, in which said retarder shaft is mounted on the rotor housing and on the stator.

9. The retarder assembly of claim 3, in which said retarder shaft is mounted on the rotor housing and on the stator.

10. The retarder assembly of claim 2, in which said retarder housing and said stator are joined together by at least one axial pin.

11. The retarder assembly of claim 3, in which said retarder housing and said stator are joined together by at least one axial pin.

12. The retarder assembly of claim 4, in which said retarder housing and said stator are joined together by at least one axial pin.

13. The retarder assembly of claim 2, in which said cup-shaped recess is dimensioned and designed such that it can receive hydrodynamic parts of different size.

* * * * *